United States Patent

Reiffenrath et al.

Patent Number: 5,236,620
Date of Patent: * Aug. 17, 1993

[54] 2,3-DIFLUOROBENZENE DERIVATIVES

[75] Inventors: Volker Reiffenrath, Rossdorf; Joachim Krause, Dieburg; Andreas Wächtler, Griesheim; Georg Weber, Erzhausen; Thomas Geelhaar, Mainz, all of Fed. Rep. of Germany

[73] Assignee: Merck Patent Gesellschaft mit Beschrankter Haftung, Darmstadt, Fed. Rep. of Germany

[ * ] Notice: The portion of the term of this patent subsequent to Mar. 30, 2010 has been disclaimed.

[21] Appl. No.: 359,672

[22] PCT Filed: Feb. 27, 1989

[86] PCT No.: PCT/EP89/00182

§ 371 Date: May 15, 1989

§ 102(e) Date: May 15, 1989

[87] PCT Pub. No.: WO89/08689

PCT Pub. Date: Sep. 21, 1989

[30] Foreign Application Priority Data

Mar. 10, 1988 [DE] Fed. Rep. of Germany ....... 3807863

[51] Int. Cl.$^5$ ............ C09K 19/34; C09K 19/30; C09K 19/06; G02F 1/13

[52] U.S. Cl. ............ 252/299.61; 252/299.63; 252/299.67; 252/299.65; 252/299.6; 359/104; 544/298; 544/224; 546/339; 568/647; 560/65; 560/73; 560/102

[58] Field of Search ............ 252/299.63, 299.66, 252/299.61, 299.65, 299.67; 359/104; 544/298, 224; 546/339; 568/647; 560/65, 73, 102

[56] References Cited

U.S. PATENT DOCUMENTS

| | | |
|---|---|---|
| 3,915,883 | 10/1975 | Van Meter et al. ....... 252/299.67 X |
| 4,368,135 | 1/1983 | Osman .................. 252/299.63 |
| 4,415,470 | 11/1983 | Eidenschink et al. ......... 252/299.63 |
| 4,514,317 | 4/1985 | Tuong et al. ............... 252/299.62 |
| 4,545,922 | 10/1985 | Eidenschink et al. ......... 252/299.63 |
| 4,551,264 | 11/1985 | Eidenschink et al. ......... 252/299.62 |
| 4,602,851 | 7/1986 | Jenner et al. ............... 359/103 X |
| 4,606,845 | 8/1986 | Romer et al. ............... 252/299.63 |
| 4,637,897 | 1/1987 | Kelly ...................... 252/299.63 |
| 4,659,502 | 4/1987 | Fearon et al. ............... 252/299.61 |
| 4,664,840 | 5/1987 | Osman .................... 252/299.63 |
| 4,710,315 | 12/1987 | Schad et al. ............... 252/299.63 |
| 4,724,097 | 2/1988 | Romer et al. ............... 252/299.63 |
| 4,776,973 | 10/1988 | Bofinger et al. ............. 252/299.61 |
| 4,808,333 | 2/1989 | Huynh-ba et al. ............ 252/299.66 |
| 4,820,839 | 4/1989 | Krause et al. .............. 544/316 |
| 4,834,904 | 5/1989 | Krause et al. .............. 252/299.01 |
| 4,897,216 | 1/1990 | Reiffenrath et al. .......... 252/299.63 |
| 4,911,863 | 3/1990 | Sage et al. ................ 252/299.65 |
| 4,925,278 | 5/1990 | Buchecker et al. ........... 350/350.5 |
| 4,925,590 | 5/1990 | Reiffenrath et al. .......... 252/299.61 |
| 4,952,337 | 8/1990 | Bradshaw et al. ............ 252/299.63 |
| 4,985,583 | 1/1991 | Eidenschink et al. .......... 558/431 |
| 4,986,931 | 1/1991 | Eidenschink et al. .......... 252/299.63 |
| 5,087,764 | 2/1992 | Reiffenrath et al. ........... 568/656 |

FOREIGN PATENT DOCUMENTS 0051738 3/1981 European Pat. Off. .
0133489 7/1984 European Pat. Off. .
WO88/02130 3/1988 World Int. Prop. O. .

Primary Examiner—Robert L. Stoll
Assistant Examiner—C. Harris
Attorney, Agent, or Firm—Millen, White, Zelano & Branigan

[57] ABSTRACT

Derivatives of difluorobenzene of the formula I $$R^1-(-A^o-)_m-Z^1-A^1-Z^2-A^2-R^2 \quad \quad I$$

wherein $R^1$, $R^2$, $A^o$, $A^1$, $A^2$, $Z^1$, $Z^2$ and m have the meaning indicated in patent claim 1, their preparation and their use as components of liquid-crystal media.

16 Claims, No Drawings

2,3-DIFLUOROBENZENE DERIVATIVES

SUMMARY OF THE INVENTION

The invention relates to 2,3-difluorobenzene derivatives of the formula I

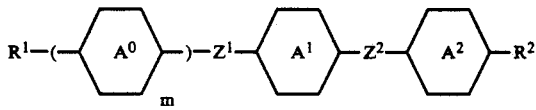

wherein $R^1$ and $R^2$ independently of one another are each alkyl having 1-15 C atoms or alkenyl having 3-15 C atoms each of which is unsubstituted, mono-substituted by cyano or at least mono-substituted by fluorine or chlorine, it being possible for a $CH_2$ group in these radicals to be replaced by —O—, —CO—, —O—CO—, —CO—O— or —O—CO—O—, $A^o$ is 1,4-phenylene or trans-1,4-cyclohexylene, m is 1 or 2, $A^1$ and $A^2$ independently of one another are each trans-1,4-cyclohexylene wherein it is also possible for one or two non-adjacent $CH_2$ groups to be replaced by —O—, or are 1,4-phenylene which is unsubstituted or mono-substituted or disubstituted by fluorine and in which it is also possible for one or two CH groups to be replaced by N, at least one of the groups $A^1$ and $A^2$ being 2,3-difluoro-1,4-phenylene, and $Z^1$ and $Z^2$ independently of one another are each —CO—O—, —O—CO—, —CH$_2$O—, —OCH$_2$— or —CH$_2$ CH$_2$, subject to the proviso that, in the event that

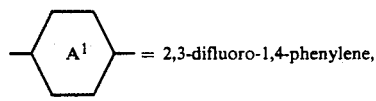 = 2,3-difluoro-1,4-phenylene, m = 1 and

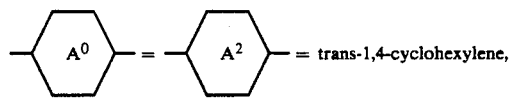 = trans-1,4-cyclohexylene, $Z^1$ or $Z^2$ is selected from the group consisting of —CO—O—, —O—CO—, —CH$_2$ O—and —OCH$_2$—.

In the following text, for the sake of simplicity, Cyc is a 1,4-cyclohexylene group, Dio is a dioxane-2,5-diyl group, Dit is a dithiane-2,5-diyl group, Pyd is a pyridine-2,5-diyl group, Pyr is a pyrimidin-2,5-diyl group, Pyz is a pyridazine-3,5-diyl group, Phe is a 1,4-phenylene group, PheF is group of the formula

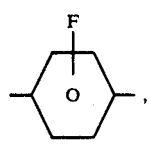

and PheF$_2$ is a group of the formula

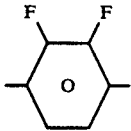

The compounds of the formula I can be used as components of liquid-crystal phases, particularly for displays based on the principle of the twisted cell, the guest-host effect, the effect of deformation of aligned phases or the effect of dynamic scattering.

Compounds of the formula I having negative anisotropy of the dielectric constant ($\Delta\epsilon=\epsilon_{\parallel}-\epsilon_{\perp}<0$, in which $\epsilon_{81}$ is the dielectric constant along the longitudinal axis of the molecule and $\epsilon_{81}$ is the dielectric constant perpendicular thereto) are aligned in an electric field with the longitudinal axis of their molecules perpendicular to the direction of the field. This effect is known and is utilized to control optical transparency in various liquid-crystal displays, for example in liquid-crystal cells of the light scattering type (dynamic scattering), of the so-called DAP type (deformation of aligned phases) or of the guest/host type (guest-host interaction).

If a liquid crystal having positive dielectric anisotropy is used, its homogeneous orientation (which is obtained by treatment of the surface of the plate) is aligned in a homotropic manner by the application of the potential, that is to say the cell is switched from "colored" to "colorless". Colorless symbols on a colored background are displayed in this manner. On the other hand, if a liquid crystal having negative dielectric anisotropy is used, its homotropic orientation (caused by treatment of the surface of the plate) is aligned parallel to the surfaces of the electrodes by the application of a potential, as a result of which it becomes possible to display colored pictorial elements on a colorless background.

The ECB effect (electrically controlled birefringence) or the DAP effect (deformation of aligned phases) was described for the first time in 1971 (M. F. Schieckel and K. Fahrenschon, "Deformation of nematic liquid crystals with vertical orientation in electrical fields", (Appl. Phys. Lett. 19 (1971), 3912). This was followed by papers by J. F. Khan (Appl. Phys. Lett. 20 (1972), 1193) and G. Labrunie and J. Robert (J. Appl. Phys. 44 (1973), 4869).

The researches of J. Robert and F. Clerc (SID 80 Digest Techn. Papers (1980), 30), J. Duchene (Displays 7 (1986), 3) and H. Schad (SID 82 Digest Techn. Papers (1982) 244) have shown that liquid-crystal phases must have high values of the ratio of the elastic constants $K_3/K_1$, high values of the optical anisotropy $\Delta n$ and values of the dielectric anisotropy $\Delta\epsilon$ between $-0.5$ and $-5$, in order to be able to be employed for highly informative display elements based on the ECB effect.

Electrooptical display elements based on the ECB effect have a homotropic edge orientation, that is to say the liquid-crystal phase has negative dielectric anisotropy.

Liquid-crystal phases which must meet a large number of requirements are needed for the industrial application of this effect in electrooptical display elements. Particularly important factors in this regard are chemical stability to moisture, air and physical influences, such as heat, radiation in the infrared, visible and ultraviolet region and direct and alternating electrical fields.

A liquid-crystal mesophase within a suitable temperature range and a low viscosity are also required for liquid-crystal phases which can be used in industry.

There is, therefore, still a great need for liquid-crystal phases having favorable meso ranges, high values of $K_3/K_1$, a high optical anisotropy $\Delta n$, a negative dielectric anisotropy $\Delta\epsilon$ and a high long-term stability.

Compounds of the formula I are suitable for use as components of chirally tilted smectic phases.

Chirally tilted smectic liquid-crystal phases having ferro-electric properties can be prepared by adding a suitable chiral doping agent to base mixtures having one or more tilted smectic phases (L. A. Veresnev et al., Mol. Cryst. Lig. Cryst. 89, 327 (1982); and H. R. Brand et al., J. Physique 44 (lett.), L-771 (1983)). Phases of this type can be used as dielectrics for high-speed displays based on the principle, described by Clark and Lagerwall, of SSFLC technology (N. A. Clark and S. T. Lagerwall, Appl. Phys. Lett. 36, 899 (1980); U.S. Pat. No. 4,367,924) based on the ferro-electric properties of the chirally tilted phase.

At the present time a number of liquid-crystal compounds having a weakly negative dielectric anisotropy have already been synthesized. On the other hand, relatively few liquid-crystal components having a large negative anisotropy of the dielectric constant are yet known. In addition, the latter generally exhibit disadvantages, such as, for example, poor solubility in mixtures, high viscosity, high melting points and chemical instability. There is, therefore, a need for further compounds which have negative dielectric anisotropy and which make it possible to improve further the properties of mixtures for a very wide variety of electrooptical applications.

Liquid-crystal components which have negative dielectric anisotropy and contain two or three rings linked via carboxyl groups or a covalent bond and contain one or more side groups, such as halogen, cyano or nitro groups, are known from German Patents 2,240,864, 2,613,293, 2,835,662 and 2,836,086 and European Patent 023,728.

The compounds claimed here are embraced within a wide formula in European Patent 084,194 and German Patent 3,410,734. No individual compounds of the formula according to the invention are mentioned in these texts, however. It was, therefore, neither possible for those skilled in the art to deduce from the state of the art possible means of synthesizing the claimed compounds in a simple manner, nor to perceive that the compounds according to the invention have mesophase ranges which are predominantly favorably situated, and that they are distinguished by a high negative dielectric anisotropy while having a low viscosity at the same time.

Nor is there any indication in these texts of the possibility of using the compounds according to the invention in displays based on the SSFLC technology, because the compounds claimed in these texts have low smectic tendency.

Symmetrical 2,3-difluoro-1,4-di-(2-(alkylcyclohexyl-)ethyl)-benzenes are also described in German Patent 3,410,734, but these do not satisfy in anyway the requirements of modern display technology.

Dibenzoic acid esters of 2,3-dichlorohydroquinone are also known, (for example Bristol et al., J. Org. Chem. 39. 3138 (1974) or Clanderman et al., J. Am. Chem. Soc. 97, 1585 (1975)), but these are monotropic or have very small mesophase ranges. The esters of 4-hydroxy-2,3-dichlorobenzoic acid described by Eidenschink et al. (Angew. Chem. 89, 103 (1977)) also only have narrow mesophase ranges.

The 4-alkyl-2,3-dichlorophenyl 4'-alkylbicyclohexyl-4-carboxylates known from German Offenlengungsschrift 2,933,563 do not permit industrial application owing to their high viscosity.

The invention was based on the task of indicating stable, liquid-crystal or mesogenic compounds having a high negative dielectric anisotropy and, at the same time, a low viscosity.

It has been found that the compounds of the formula I are excellently suitable for use as components of liquid-crystal phases. In particular, stable, liquid-crystal phases having a wide mesophase range and a comparatively low viscosity can be prepared with their aid.

The compounds of the formula I are also suitable for use as components of chirally tilted smectic liquid-crystal phases.

In addition, the range of liquid-crystal substances which are suitable from various aspects of technical performance for the preparation of liquid-crystal mixtures is considerably broadened, in a very general way, by the provision of the compounds of the formula I.

The compounds of the formula I have a wide field of application. Depending on the choice of substituents, these compounds can be used as the base materials of which liquid-crystal phases are predominantly composed; it is also possible, however, to add compounds of the formula I to liquid-crystal base materials belonging to other classes of compounds in order to vary, for example, the dielectric and/or optical anisotropy and/or the viscosity and/or the spontaneous polarization and/or the phase ranges and/or the tilt angle and/or the pitch of such a dielectric.

The compounds of the formula I are also suitable for use as intermediates for the preparation of other substances which can be used as constituents of liquid-crystal dielectrics.

The compounds of the formula I are colorless in the pure state and form liquid-crystal mesophases within a temperature range which is favorably situated for electro-optical use. They are very stable to chemicals, heat and light.

The invention therefore relates to the compounds of the formula I, in particular the compounds of the formula Ia

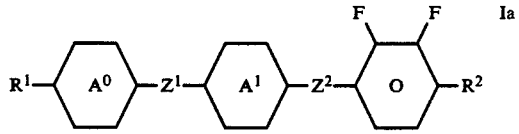

and the compounds of the formula Ib

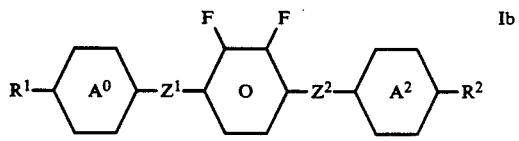

The invention also relates to the use of the compounds of the formula I as components of liquid-crystal media. The invention also relates to liquid-crystal media containing at least one compound of the formula I, and to liquid-crystal display elements containing media of this type. Media of this type have particularly advantageous elastic constants and are particularly suitable for TFT mixtures owing to their low $\Delta\epsilon/\epsilon\perp$ values.

In the preceding and following text, unless anything to the contrary is expressly noted, $R^1$, $R^2$, $A^o$, $A^1$, $A^2$, $Z^1$, $Z^2$ and m have the meaning indicated.

Accordingly, the compounds of the formula I embrace compounds having three rings of the partial formulae Ia and Ib:

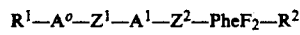  Ia

  Ib and compounds having four rings of the partial formulae Ic and Id

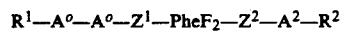  Ic

  Id

In the compounds of the preceding and following formulae $R^1$ and $R^2$ are preferably alkyl, and also alkoxy.

$A^1$ and $A^2$ are Phe, Pyr, Pyd, Pyz, Cyc, Dio, Dit, PheF and PheF$_2$; the compound of the formula I preferably does not contain more than one of the radicals PheF$_2$, Pyr, Pyd, Pyz, Dio and Dit.

$A^o$ is Phe and Cyc.

$Z^1$ and $Z^2$ are preferably —CH$_2$CH$_2$—, —O—CO— or —CO—O—, and also —CH$_2$O— or —O—CH$_2$—.

Compounds of the formula Ia which are particularly preferred are those wherein $Z^1$ is —CH$_2$CH$_2$—, —O—CO— or —CO—O—, and $Z^2$ is —CH$_2$CH$_2$—, —CO—O— or —CH$_2$O—.

Compounds of the formula Ib which are particularly preferred are those wherein $Z^1$ is —CH$_2$CH$_2$—, —CH$_2$—O—, —O—CH$_2$— or —O—CO— and $Z^2$ is —CH$_2$CH$_2$—, —CH$_2$O—, —OCH$_2$ or —CO—O—.

m is preferably 0 or 1.

In the preceding and following formulae $R^1$ and $R^2$ preferably have 1-13 C atoms, in particular 3-12 C atoms. Compounds of the formula I in which $R^1$ and $R^2$ have 1-7 C atoms, preferably 3-6 C atoms, are particularly suitable for liquid-crystal phases for display elements based on the ECB effect. On the other hand, compounds of the formula I in which $R^1$ and $R^2$ have 7-15C atoms, preferably 8-12 C atoms, are suitable for liquid-crystal phases having ferro-electric properties. One or two CH$_2$ groups can also be replaced in $R^1$ and $R^2$. Preferably, only one CH$_2$ group is replaced by —O—, —CO— —O—CO—, —CO—O— or —OCO—O—, in particular by —O—, —O—CO— or —CO—O—.

In the preceding and following formulae $R^1$ and $R^2$ are preferably alkyl, alkoxy or another oxaalkyl group, and also alkyl groups in which one or more CH$_2$ groups can be replaced by a grouping selected from the group composed of —O—, —O—CO—, —CH=CH—, —CH-halogen- and —CHCN— or by a combination of two suitable groupings, two hetero atoms not being directly attached to one another.

If $R^1$ and $R^2$ are alkyl radicals in which one ("alkoxy" or "oxaalkyl") group or two non-adjacent ("alkoxyalkoxy" or "dioxaalkyl") CH$_2$ groups can also be replaced by O atoms, they can be linear or branched. Preferably, they are linear, have 2, 3, 4, 5, 6 or 7 C atoms and, accordingly, are preferably ethyl, propyl, butyl, pentyl, hexyl, heptyl, ethoxy, propoxy, butoxy, pentoxy, hexoxy or heptyloxy, and also methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably linear 2-oxapropyl (=methoxymethyl), 2-oxabutyl (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl, 1,3-dioxabutyl (=methoxymethoxy), 1,3-, 1,4- or 2,4-dioxapentyl, 1,3-, 1,4-, 1,5-, 2,4-, 2,5- or 3,5-dioxahexyl, or 1,3-, 1,4-, 1,5-, 1,6-, 2,4-, 2,5-, 2,6-, 3,5-, 3,6- or 4,6-dioxaheptyl.

If $R^1$ and $R^2$ are an alkenyl radical, this can be linear or branched. It is preferably linear and has 2 to 10 C atoms. Accordingly, it is especially vinyl, prop-1-enyl, prop-2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7-, -8-enyl, decyl-1-, -2-, -3-, -4-, -5-, -6-, -7-, -8- or -9-enyl.

If $R^1$ and $R^2$ are an alkyl radical in which a CH$_2$ group has been replaced by —O—CO— or —CO—O—, this radical can be linear or branched. It is preferably linear and has 2 to 6 C atoms. Accordingly, it is especially acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)-butyl.

Compounds of the formula I having branched wing groups $R^1$ and/or $R^2$ can occasionally be of importance because of improved solubility in the customary liquid-crystal base materials, but they are of particular importance as chiral doping agents, if they are optically active. Smectic compounds of this type are suitable for use as components of ferro-electric materials.

As a rule, branched groups of this type do not contain more than one chain branching. Preferred branched radicals $R^1$ and/or $R^2$ are isopropyl, 2-butyl (=1-methylpropyl), isobutyl (=2-methylpropyl), 2-methylbutyl, isopentyl, (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptyloxy, 2-oxa-3-methylbutyl, 3-oxa-4-methylpentyl, 4-methylhexyl, 2-nonyl, 2-decyl, 2-dodecyl, 6-methyloctyloxy, 6-methyloctanoyloxy, 5-methylheptyloxycarbonyl, 2-methylbutyryloxy, 3-methylvaleryloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl and 2-methyl-3-oxahexyl.

Formula I embraces not only the racemates of these compounds but also the optical antipodies and mixtures thereof.

Preferred compounds of the formulae I and Ia to Id are those in which at least one of the radicals contained therein has one of the preferred meanings indicated.

Amongst the trinuclear compounds of the partial formulae Ia and Ib those of the partial formulae I1 to I12 are preferred:

$R^1$—Phe—$Z^1$—Phe—$Z^2$—PheF$_2$—$R^2$   I1

$R^1$—Phe—$Z^1$—Cyc—$Z^2$—PheF$_2$—$R^2$   I2

$R^1$—Phe—$Z^1$—Pyd—$Z^2$—PheF$_2$—$R^2$   I3

$R^1$—Cyc—$Z^1$—Cyc—$Z^2$—PheF$_2$—$R^2$   I4

$R^1$—Cyc—$Z^1$—Phe—$Z^2$—PheF$_2$—$R^2$   I5

$R^1$—Cyc—$Z^1$—PheF$_2$—$Z^2$—Phe—$R^2$   I6

$R^1$—Cyc—$Z^1$—PheF$_2$—$Z^2$—Cyc—$R^2$   I7

$R^1$—Phe—$Z^1$—PheF$_2$—$Z^2$—Pyr—$R^2$   I9

$R^1$—Phe—$Z^1$—PheF$_2$—$Z^2$—Pyd—$R^2$   I10

$R^1$—Cyc—$Z^1$—PheF$_2$—$Z^2$—Pyd—$R^2$   I11

$R^1$—Cyc—$Z^1$—PheF$_2$—$Z^2$—Pyr—$R^2$   I12

Amongst the tetranuclear compounds of the formulae Ic and Id those of the partial formulae I13 to I38 are preferred:

$R^1$—Phe—Phe—$Z^1$—Phe—$Z^2$—PheF$_2$—$R^2$   I13

$R^1$—Phe—Phe—$Z^1$—Cyc—$Z^2$—PheF$_2$—$R^2$   I14

$R^1$—Phe—Phe—$Z^1$—Pyd—$Z^2$—PheF$_2$—$R^2$   I15

$R^1$—Phe—Phe—$Z^1$—Dio—$Z^2$—PheF$_2$—$R^2$   I16

$R^1$—Phe—Phe—$Z^1$—PheF$_2$—$Z^2$—Phe—$R^2$   I17

$R^1$—Phe—Phe—$Z^1$—PheF$_2$—$Z^2$—Cyc—$R^2$   I18

$R^1$—Phe—Phe—$Z^1$—PheF$_2$—$Z^2$—Dio—$R^2$   I19

$R^1$—Cyc—Phe—$Z^1$—PheF$_2$—$Z^2$—Dio—$R^2$   I20

$R^1$—Cyc—Phe—$Z^1$—PheF$_2$—$Z^2$—Phe—$R^2$   I21

$R^1$—Cyc—Phe—$Z^1$—PheF$_2$—$Z^2$—Cyc—$R^2$   I22

$R^1$—Cyc—Phe—$Z^1$—PheF$_2$—$Z^2$—Pyr—$R^2$   I23

$R^1$—Cyc—Phe—$Z^1$—Phe—$Z^2$—PheF$_2$—$R^2$   I24

$R^1$—Cyc—Phe—$Z^1$—Pyr—$Z^2$—PheF$_2$—$R^2$   I25

$R^1$—Cyc—Phe—$Z^1$—Cyc—$Z^2$—PheF$_2$—$R^2$   I26

$R^1$—Cyc—Phe—$Z^1$—PheF—$Z^2$—PheF$_2$—$R^2$   I27

$R^1$—Cyc—Cyc—$Z^1$—PheF—$Z^2$—PheF$_2$—$R^2$   I28

$R^1$—Cyc—Cyc—$Z^1$—Phe—$Z^2$—PheF$_2$—$R^2$   I29

$R^1$—Cyc—Cyc—$Z^1$—Cyc—$Z^2$—PheF$_2$—$R^2$   I30

$R^1$—Cyc—Cyc—ZI—PheF$_2$—$Z^2$—Phe—$R^2$   I31

$R^1$—Cyc—Cyc—$Z^1$—PheF$_2$—$Z^2$—Cyc—$R^2$   I32

$R^1$—Cyc—Cyc—$Z^1$—PheF$_2$—$Z^2$—Pyr—$R^2$   I33

$R^1$—Phe—Cyc—$Z^1$—PheF$_2$—$Z^2$—Pyr—$R^2$   I34

$R^1$—Phe—Cyc—$Z^1$—PheF$_2$—$Z^2$—Phe—$R^2$   I35

$R^1$—Phe—Cyc—$Z^1$—PheF$_2$—$Z^2$—Cyc—$R^2$   I36

$R^1$—Phe—Cyc—$Z^1$—Phe—$Z^2$—PheF$_2$—$R^2$   I37

$R^1$—Phe—Cyc—$Z^1$—Cyc—$Z^2$—PheF$_2$—$R^2$   I38

Those of the formulae Ia to Id and I1 to I35 mentioned above which contain one or more groups Dio, Dit, Pyr, Pyz and/or Pyr include in each case the two possible 2,5-position isomers.

In the compounds mentioned above the groups $Z^1$ and $Z^2$ independently of one another are each —CO—O—, —O—CO—, —CH$_2$O—, —OCH$_2$— or —CH$_2$CH$_2$—, preferably —CO—O—, —O—CO— or —CH$_2$CH$_2$—; in the compounds of the formula 17 one of the groups $Z^1$ or $Z^2$ is selected, in accordance with the proviso, from the group consisting of —O—CO—, —CO—O—, —CH$_2$O—and —OCH$_2$—.

Compounds of the formula I in which $Z^2$ is a —CO—O— or —O—CO— group are particularly preferred, especially those derived from 2,3-difluorobenzoic acid or from 2,3-difluorohydroquinone.

The compounds of the formula I listed in the following groups II-IV, alkyl and alkoxy having the meanings indicated, are particularly preferred.

II

Alkyl—Cyc—CH$_2$O—PheF$_2$—CH$_2$CH$_2$—Cyc—Alkyl

Alkyl—Cyc—CO—O—PheF$_2$—CH$_2$CH$_2$—Cyc—Alkyl

*Alkyl—Phe—CO—O—PheF$_2$—CH$_2$CH$_2$—Cyc—Alkyl*

Alkoxy—Phe—CO—O—PheF$_2$—CH$_2$CH$_2$—Cyc—Alkyl

Alkoxy—Phe—CO—O—PheF$_2$—O—CO—Cyc—Alkyl

Alkoxy—Phe—CO—O—PheF$_2$—O—CO—Phe—Alkyl

Alkoxy—Phe—CO—O—PheF$_2$—O—CO—Phe—Alkoxy

Alkoxy—Phe—CO—O—PheF$_2$—CO—O—Phe—Alkoxy

Alkoxy—Phe—CO—O—PheF$_2$—CO—O—Phe—Alkoxy

Alkyl—Phe—CO—O—PheF$_2$—CO—O—Phe—Alkoxy

Alkyl—Phe—CO—O—PheF$_2$—CO—O—Phe—Alkyl

Alkyl—Phe—CO—O—PheF$_2$—CO—O—Pyd—Alkyl

Alkyl—CYC-CH$_2$CH$_2$—PheF$_2$—CO—O—Pyd—Alkyl

III

Alkyl—CYC-CH$_2$CH$_2$—Cyc—CH$_2$CH$_2$PheF$_2$—Alkyl

Alkyl—CYC-CH₂CH₂—Cyc—CH₂CH₂—PheF₂—Alkoxy

Alkyl—CYC-CH₂CH₂—Cyc—CO—O—PheF₂—Alkoxy

Alkyl—CYC-CH₂CH₂—Phe—CO—O—PheF₂—Alkyl

Alkyl—CYC-CH₂CH₂—Phe—CO—O—PheF₂—Alkoxy

Alkyl—CYC-CH₂CH₂—Phe—CH₂—O—PheF₂—Alkoxy

Alkyl—Phe—CH₂CH₂—Pyd—O—CO—PheF₂—Alkoxy

Alkoxy—Phe—CH₂CH₂—Pyd—O—CO—PheF₂—Alkoxy

Alkoxy—Phe—CH₂CH₂—Pyd—O—CO—PheF₂—Alkoxy

Alkyl—Phe—CH₂CH₂—Pyd—O—CO—PheF₂—Alkoxy

Alkyl—Phe—CH₂CH₂—Pyd—O—CO—PheF₂—Alkyl

Alkyl—Cyc—CH₂CH₂—Pyr—O—CO—PheF₂—Alkyl

Alkyl—Cyc—CH₂CH₂—Pyd—O—CO—PheF₂—Alkyl

IV

Alkyl—CycCyc—CH₂CH₂—PheF₂—OCH₂—Phe—Alkyl

Alkyl—CycCyc—CH₂CH₂—PheF₂—OCH₂—Phe—Alkoxy

Alkyl—CycCyc—CH₂CH₂—PheF₂—O—CO—Phe—Alkoxy

Alkyl—CycCyc—CH₂CH₂—PheF₂—O—CO—Phe—Alkyl

Alkyl—CycCyc—CH₂CH₂—PheF₂—O—CO—Cyc—Alkyl

Alkyl—CycCyc—CH₂CH₂—PheF₂—CH₂CH₂—Cyc—Alkyl

The compounds of the formula I are prepared by methods known per se, such as are described in the literature (for example in the standard works such as Houben-Weyl, Methoden der Organischem Chemie ("Methods of Organic Chemistry"), Georg-Thieme-Verlag, Stuttgart), specifically under reaction conditions which are known and suitable for he reactions mentioned. In this connection it is also possible to make use of variants which are known per se, but not mentioned here in detail.

If desired, the starting materials can also be formed in situ by a processing in which they are not isolated from the reaction mixture, but are immediately reacted further to give the compound of the formula I.

Compounds of the formula I are accessible using 1,2-difluorobenzene as starting material.

This compound is metalated by a known process (for example A. M. Roe et al., J. Chem Soc. Chem. Comm., 22, 582 (1965)) and is reacted with the corresponding electrophile. This reaction sequence can be carried out a second time using the 1-substituted 2,3-difluorobenzene thus obtained, and the 1,4-disubstituted 2,3-difluorobenzene derivatives of the formula I are obtained in this manner. 1,2-Difluorobenzene or 1-substituted 2,3-difluorobenzene is reacted with phenyllithium, lithium tetramethylpiperidine, n-, sec.- or tert-butyllithium at temperatures from $-100°$ C. to $+50°$ C., preferably $-78°$ C. to $0°$ C., in an inert solvent, such as diethyl ether, tetrahydrofuran, dimethoxyethane, tert.-butyl methyl ether or dioxane, hydrocarbons, such as hexane, heptane, cyclohexane, benzene or toluene, or mixtures of these solvents, if appropriate with the addition of a complexing agent, such as tetramethylenediamine or hexamethylphosphoric triamide.

The lithium-2,3-difluorophenyl compounds are reacted with the corresponding electrophiles at $-100°$ C. to $0°$ C., preferably at $-50°$ C. Suitable electrophiles are aldehydes, ketones, nitriles, epoxides or carboxylic acid derivatives, such as esters, anhydrides or halides, halogenoformic acid ester or carbon dioxide.

The potassium-2,3-difluorophenyl compounds are suitable for the reaction with aliphatic halogen compounds. These potassium compounds are obtained by transmetalating the lithium compounds with potassium tert.-butylate at $-80°$ to $-120°$ C.

The lithium-2,3-difluorophenyl compounds are transmetalated for the reaction with compounds containing several electrophilic reaction centers (for example, an aldehyde group as well as an ester group). The titanium-2,3-difluorophenyl compounds are particularly suitable for this purpose.

The compounds of the formula I can be prepared by reducing a compound which otherwise corresponds to the formula I, but contains one or more reducible groups and/or C—C bonds instead of H atoms.

Suitable reducible groups are preferably carbonyl groups, especially keto groups, and also, for example, free or esterified hydroxyl groups or halogen atoms linked to an aromatic nucleus. Preferred starting materials for the reduction correspond to the formula I, but can contain a cyclohexene ring or cyclohexanone ring instead of a cyclohexane ring and/or a —CH=CH— group instead of a —CH₂CH₂— group and/or a —CO— group instead of a —CH₂— group and/or a free or functionally modified (for example in the form of its p-toluenesulfonate) OH group instead of an H atom.

The reduction can be carried out, for example, by catalytic hydrogenation at temperatures between 0° and about 200° and under pressures between about 1 and 200 bar in an inert solvent, for example, an alcohol, such as methanol, ethanol, or isopropanol, an ether, such as tetrahydrofuran (THF) or dioxane, an ester, such as ethyl acetate, a carboxylic acid, such as acetic acid, or a hydrocarbon, such as cyclohexane. Suitable catalysts are preferably noble metals, such as Pt or Pd, and these can be employed in the form of oxides (for example PtO₂ or PdO) on a support (for example Pd on charcoal, calcium carbonate or strontium carbonate) or in a finely divided form.

Ketones can also be reduced by the Clemmensen method (using zinc, amalgamated zinc or tin and hydrochloric acid, preferably in aqueous-alcoholic solution or in a heterogeneous phase using water/toluene at temperatures between about 80° and 120°).

Reduction by means of complex hydrides is also possible. For example, arylsulfonyloxy groups can be removed reductively by means LiAlH₄, in particular p- toluenesulfonyloxymethyl groups can be reduced to methyl groups, preferably in an inert solvent, such as diethylether or THF, at temperatures between about 0° and 100°. Double bonds can be hydrogenated by means of $NaBH_4$ or tributyltin hydride in methanol.

Esters of the formula I can also be obtained by esterifying corresponding carboxylic acids (or reactive derivatives thereof) with alcohols or phenols (or reactive derivatives thereof).

Suitable reactive derivatives of the carboxylic acids mentioned are, in particular, the acid halides, above all the chlorides and bromides, and also the anhydrides, for example also mixed anhydrides, azides or esters, in particular alkyl esters having 1–4 C atoms in the alkyl group.

Suitable reactive derivatives of the alcohols or phenols mentioned are, in particular, the corresponding metal alcoholates or phenates, preferably of an alkali metal, such as Na or K.

The esterification is advantageously carried out in the presence of an inert solvent. Solvents which are very suitable are, in particular ethers, such as diethyl ether, di-n-butylether, THF, dioxane or anisol, ketones, such as acetone, butanone or cyclohexanone, amides, such as DMF or hexamethylphosphoric triamide, hydrocarbons, such as benzene, toluene or xylene, halogenated hydrocarbons, such as carbon tetrachloride or tetrachloroethylene, and sulfoxides, such as dimethyl sulfoxide, or sulfolane. Water-imiscible solvents can at the same time be used advantageously for the removal, by azeotropic distillation of the water formed in the course of the esterification. Occasionally it is also possible to use an excess of an organic base, for example pyridine, quinoline or triethylamine, as a solvent for the esterification. The esterification can also be carried out in the absence of a solvent, for example merely by heating the components in the presence of sodium acetate. The reaction temperature is usually between −50° and +250°, preferably between −20° and +80°. At these temperatures the esterification reactions are, as a rule, complete after 15 minutes to 48 hours.

A further preferred process for the preparation of the esters is to react a carboxylic acid with an alcohol or phenol in the presence of a dehydrating agent, if appropriate using an organic base as catalyst.

Dehydrating agents which are particularly preferred are molecular sieves or carbodiimides, such as, for example, dicyclohexylcarbodiimides. A particularly suitable basic catalyst is 4-dimethylaminopyridine.

In an individual case the reaction conditions for the esterification depend largely on the nature of the starting materials used. Thus a free carboxylic acid will, as a rule, be reacted with a free alcohol or phenol in the presence of a strong acid, for example a mineral acid, such as hydrochloric acid or sulfuric acid. A preferred procedure is to react an acid anhydride, or especially an acid chloride, with an alcohol, preferably in a basic medium, bases of importance being, in particular, alkali metal hydroxides, such as sodium hydroxide or potassium hydroxide, alkali metal carbonates or bicarbonates, such as sodium carbonate, sodium bicarbonate, potassium carbonate or potassium bicarbonate, alkali metal acetates, such as sodium acetate or potassium acetate, alkaline earth metal hydroxides, such as calcium hydroxide, or organic bases, such as triethylamine, pyridine, lutidine, collidine or quinoline. A further preferred embodiment of the esterification consists in first converting the alcohol or the phenol into the sodium alcoholate or phenate or potassium alcoholate or phenate, for example by treatment with ethanolic sodium hydroxide or potassium hydroxide solution, isolating this alcoholate or phenate and suspending it, together with sodium bicarbonate or potassium carbonate, with stirring in acetone or diethylether, and adding a solution of the acid chloride or anhydride in diethylether, acetone or DMF to this suspension, preferably at temperatures between about −25° and +20°.

Ethers of the formula I can be obtained by etherifying corresponding hydroxy compounds, preferably corresponding phenols, the hydroxy compound being preferably first converted into a corresponding metal derivative, for example into the corresponding alkali metal alcoholate or alkali metal phenate by treatment with NaH, $NaNH_2$, NaOH, KOH, $Na_2CO_3$ or $K_2CO_3$. This alcoholate or phenate can then be reacted with the corresponding alkyl halide or sulfonate or dialkyl sulfate, preferably in an inert solvent, such as acetone, 1,2-dimethoxyethane, DMF or dimethyl sulfoxide, or an excess or aqueous or aqueous-alcoholic NaOH or KOH, at temperatures between about 20° and 100°.

The liquid-crystal media according to the invention preferably contain, in addition to one or more compounds according to the invention, 2 to 40, in particular 4 to 30, components as further constituents. It is very particularly preferable for these media to contain 7 to 25 components, as well as one or more compounds according to the invention. These further constituents are preferably selected from nematic or nematogenic (monotropic or isotropic) substances, in particular substances belonging to the classes of azoxybenzenes, benzylideneanilines, biphenyls, terphenyls, phenyl or cyclohexyl benzoates, phenyl or cyclohexyl cyclohexane carboxylates, phenyl or cyclohexyl cyclohexybenzoates, phenyl or cyclohexyl cyclohexanecarboxylates, cyclohexylphenyl benzoates, cyclohexanecarboxylates or cyclohexylcyclohexanecarboxylates, phenylcyclohexane, cyclohexylbiphenyls, phenylcyclohexylcyclohexane, cyclohexylcyclohexanes, cyclohexylcyclohexenes, cyclohexylcyclohexylcyclohexenes, 1,4-bis-cyclohexylbenzenes, 4,4′-bis-cyclohexylbiphenyls, phenylpyrimidines, cyclohexylpyrimidines, phenylpyridines, cyclohexylpyridines, phenyldioxanes,cyclohexyldioxanes, phenyl-1,3-dithianes, cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolanes and substituted cinnamic acids. The 1,4-phenylene groups in these compounds can also contain fluorine.

The most important compounds suitable for use as further constituents of media according to the invention can be characterized by the formulae 1, 2, 3, 4 and 5:

| | |
|---|---|
| R′—L—E—R″ | 1 |
| R′—L—COO—E—R″ | 2 |
| R′—L—OOC—E—R″ | 3 |
| R′—L—$CH_2CH_2$—E—R″ | 4 |
| R′—L—C≡C—E—R″ | 5 |

In the formulae 1, 2, 3, 4 and 5, L and E, which can be identical or different, independently of one another are each a divalent radical from the group composed of —Phe—, —Cyc—, —Phe—Phe—, —Phe—Cyc—, —Cyc—Cyc—, —Pyr—, —Dio—, —G—Phe— and —G—Cyc— and mirror images thereof, Phe being 1,4-phenylene which is unsubstituted or substituted by fluorine, Cyc being trans-1,4-cyclohexylene or 1,4-cyclohexenylene, Pyr being pyrimidine-2,5-diyl or pyridine-2,5-diyl, Dio being 1,3-dioxane-2,5-diyl and G being 2-(trans-1,4-cyclohexyl)-ethyl, pyrimidine-2,5-diyl, pyridine-2,5-diyl or 1,3-dioxane-2,5-diyl.

Preferably, one of the radicals L and E is Cyc, Phe or Pyr. E is preferably Cyc, Phe or Phe-Cyc. The media according to the invention preferably contain one or more components selected from the compounds of the formulae 1, 2, 3, 4 and 5 in which L and E are selected from the group comprising Cyc, Phe and Pyr, and, at the same time, one or more components selected from the compounds of the formulae 1, 2, 3, 4 and 5, wherein one of the radicals L and E is selected from the group comprising Cyc, Phe and Pyr and the other radical is selected from the group comprising —Phe—Phe—, —Phe—Cyc—, —Cyc—Cyc—, —G—Phe— and —G—Cyc—, and, if appropriate, one or more components selected from the compounds of the formulae 1, 2, 3, 4 and 5, wherein the radicals L and E are selected from the group comprising —Phe—Cyc—, —Cyc—Cyc—, —G—Phe—and —G—Cyc.

In the compounds of the partial formulae 1a, 2a, 3a, 4a and 5a, R' and R" independently of one another are each alkyl, alkenyl, alkoxy, alkenyloxy or alkanoyloxy each of which has up to 8 carbon atoms. In most of these compounds R' and R" are different from one another, one of these radicals being alkyl or alkenyl in most cases. In the compounds of the partial formulae 1b, 2b 3b, 4b and 5b, R" is —CN, —CF$_3$, F, Cl or —NCS; in this case R has the meaning indicated in the case of the compounds of the partial formulae 1a to 5a and is preferably alkyl or alkenyl. Other variants of the substituents envisaged in the compounds of the formulae 1, 2, 3, 4 and 5 are, however, also customary. Many substances of this type or mixtures thereof are commercially available. All these substances can be obtained by methods known from the literature or analogously thereto.

In addition to components from the group of the compounds 1a, 2a, 3a, 4a and 5a (group 1), the media according to the invention also preferably contain compounds from the group of the compounds 1b, 2b, 3b, 4b and 5b (group 2), the proportions thereof being preferably as follows:

Group 1: 20 to 90%, in particular 30 to 90%,
Group 2: 10 to 80%, in particular 10 to 50%, the sum of the proportions of the compounds according to the invention and of the compounds from groups 1 and 2 adding up to 100%.

The media according to the invention preferably contain 1 to 40%, particularly preferably 5 to 30%, of compounds according to the invention. Media containing more than 40%, in particular 45 to 90%, of compounds according to the invention are also preferred. The media preferably contain three, four or five compounds according to the invention.

The preparation of the media according to the invention is effected in a manner customary per se. As a rule, the components are dissolved in one another, expediently at an elevated temperature. The liquid-crystal phases according to the invention can be modified by means of suitable additives so that they can be used in all hitherto disclosed types of liquid-crystal display elements. Additives of this type are known to those skilled in the art and are described in detail in the literature (H. Kelker/R. Hatz, Handbook of Liquid Crystals, Verlag Chemie, Weinheim, 1980). For example, it is possible to add pleochroic dyestuffs in order to prepare colored guest-host systems, or substances to alter the dielectric anisotropy, the viscosity and/or the orientation of the nematic phases.

EXAMPLES

The following examples are intended to illustrate the invention without limiting it. m.p.=melting point; c.p.=clear point. In the preceding and following text percentages are per cent by weight; all temperatures are quoted in degrees centigrade.

"Customary working up" means the following: water is added, the mixture is extracted with methylene chloride, the phases are separated, the organic phase is dried and evaporated and the product is purified by crystallization and/or chromatography.

There are also the following abbreviations:

C: Crystalline-solid state, S: Smectic phase (the index characterizes the type of phase), N: Nematic state, Ch: Cholesteric phase, I: Isotropic phase. The number between two symbols indicates the transition temperature in degrees centigrade.

EXAMPLE 1

65 ml of a solution of 0.1 mol of n-butyllithium in hexane is added at −100° C. to a mixture of 0.1 mol of 4- propoxy-2,3-difluorobenzene, 0.09 mol of potassium tert.butylate and 250 ml of tetrahydrofuran. After stirring for 10 minutes a mixture of 0.1 mole of trans-4-(trans-4-propylcyclohexylethyl)-cyclohexylethyl iodide, 0.1 mol of N,N-dimethylpropyleneurea and 100 ml of tetrahydrofuran is added to the mixture. Stirring for 1 hour at −85° C., warming up to −40° C. and working up in the customary manner gives trans-4-(2-(4-propoxy-2,3-difluorophenyl)-ethyl)-1-(2-(trans-4-propylcyclohexyl)ethyl)-cyclohexane.

EXAMPLE 2

0.1 mol of dicyclohexylcarbodiimide in 80 ml of methylene chloride is added at 0° C. to a mixture of 0.1 mol of 4-(2-(trans-4-propylcyclohexyl)-ethyl)-2,3-difluorobenzoic acid (prepared from 2,3-difluorophenylpotassium, produced analogously to Example 1, and trans-4-propylcyclohexylethyl iodide, by subsequent deprotonation with n-butyllithium and carboxylation with carbon dioxide), 0.1 mol of 4-pentylphenol, 1.0 mmol of 4-N,N-dimethylaminopyridine and 250 ml of methylene chloride. Stirring for 12 hours at room temperature and working up in the customary manner gives 4-(4-(2-(trans-4-propylcyclohexyl)-ethyl)-2,3-difluorobenzoyloxy)-pentylbenzene.

The following are prepared analogously: 4-(4-(2-(trans-4-pentylcyclohexyl)-ethyl)-2,3-difluorobenzoyloxy)-pentylbenzene, C 45°, S$_A$ 92°, N 130.3°, I, and trans-4-(4-(trans-4-pentylcyclohexyl)-ethyl)-2,3-difluorobenzoyloxy)-hexylcyclohexane, C 49°, S$_A$ 55°, N 118°, I.

EXAMPLE 34

0.1 mol of 4-(2-(trans-4-pentylcyclohexyl)-ethyl)-benzoic acid are esterified with 0.1 mol of 2,3-difluoro-4-propylphenol as in Example 2. This gives 4-(4-(2-(trans- 4-pentylcyclohexyl)-ethyl)-benzoyloxy)-2,3-difluoropropylbenzene.

The following is prepared analogously: 4-(2-(trans-4-pentylcyclohexyl)-ethyl)-1-(4-dodecyloxybenzoyloxy)-2,3-difluorobenzene, C 60°, S$_c$ 81°, N 127°, I

EXAMPLE 4

0.1 mol of 2,3-difluoro-p-hydroquinone are reacted as in Example 2 with 0.2 mol of trans-4-heptylcyclohexanecarboxylic acid and 0.2 mol of dicyclohexylcarbodiimide. This gives 1,4-di-(trans-4-heptylcyclohexylcarbonyloxy)-2,3-difluorobenzene.

The following are prepared analogously: 1,4-Di-(trans-4-pentylcyclohexylcarbonyloxy)-2,3-difluorobenzene, C 87°, N 208°, I 1,4-Di-(trans-4-octylcyclohexylcarbonyloxy)-2,3-difluorobenzene, C 80°, S 91,S$_2$ 103,S$_c$ 123,N 177,I

EXAMPLE 5

0.1 mol of 1-(5-hydroxypyridine-2-yl)-2-(4-heptoxyphenyl)-ethane (prepared by monoalkylation of the dianion of 5-hydroxy-2-methylpyridine by means of 4-heptyloxybenzyl bromide) are esterified as in Example 2 with 0.1 mol of 2,3-difluoro-4-heptyloxybenzoic acid. This gives 5-(2,3-difluoro-4-heptyloxybenzoyloxy)-2-(2-(4-heptyloxyphenyl)ethyl)-pyridine.

The following is prepared analogously: 5-(2,3-difluoro-4-octyloxybenzoyloxy)-2-(2-(trans-4-heptyloxycyclohexyl)-ethyl)-pyridine (sic), C 73°, S$_c$ 115°, N 134°, I

EXAMPLE 6

A solution of 37.5 9 of 1,2-difluoro-3-(trans-4-n-propylcyclohexylmethoxy)-benzene in 70 ml of THF, 68.5 ml of a 1.6N solution of butyllithium (BuLi) in hexane and then a solution of 39.8 g of trans-4-(trans-4-n-propylcyclohexyl)-cyclohexylethyl iodide and 20 g of 1,3-dimethyltetrahydro-2(1H)-pyrimidone (DMPU) in 70 ml of THF are added successively at −90° C. to a well stirred solution of 12.3 g of potassium tertiary butylate (t-BuOK) in 80 ml of THF. When the addition is complete, the suspension, which can be stirred with difficulty, is allowed to warm up slowly to −40° C., water is added and the mixture is worked up in a customary manner. This gives trans-4-propylcyclohexyl-methyl 4-(2-(trans,trans-4'-propylbicyclohex-4-yl)-ethyl)-2,3-difluorophenyl ether.

The following is prepared analogously: Trans-4-pentylcyclohexylmethyl 4-(2-(trans-4-pentylcyclohexyl)-ethyl)-2,3-difluorophenyl) ether, C 76°, S$_A$ (72°),N 109.4°, I

EXAMPLE 7

0.05 mol of dicyclohexylcarbodiimide (DCC), dissolved in methylene chloride, is added at 0° C. to a solution of 0.05 mol of 4-(trans-4-(trans-4-n-propylcyclohexyl)-cyclohexylethyl-2,3-difluorophenyl (which can be prepared by reacting 2,3-difluoroanisol with equimolar amounts of t-BuOK and BuLi in THF at −90° and alkylating the potassium compound with trans-4-(trans-4-n-propylcyclohexyl)cyclohexylethyl iodide in the presence of an equimolar amount of DMPU, followed by ether cleavage with hydrobromic acid/glacial acetic acid) and 0.05 mol of trans-4-n-pentylcyclohexanecarboxylic acid in methylene chloride (70 ml), in the presence of a catalytic amount of 4-N,N'-dimethylaminopyridine (DMAP). The reaction mixture is stirred for 12 hours at room temperature, the precipitated dicyclohexylurea is removed and the mixture is worked up in the customary manner. This gives 4-(trans4-propylcyclohexyl)-cyclohexylethyl)-2,3-difluorophenyl].

The following are prepared analogously: 4-(2-(trans-4-pentylcyclohexyl)-ethyl)-2,3-difluorophenyl 4-octyloxybenzoate, C 51°, N 138°, I 4-(2-(trans-4-pentylcyclohexyl)-ethyl-2,3-difluorophenyl trans-4-pentylcyclohexanecarboxylate, C 58°, N 151.8°, I

EXAMPLE A

A nematic liquid-crystal medium consisting of
13% of p-trans-4-propylcyclohexylbenzonitrile,
20% of trans-1-p-methoxyphenyl-4-propylcyclohexane,
13% of trans-1-p-butoxyphenyl-4-propylcyclohexane,
17% of 4-(4-(2-(trans-4-pentylcyclohexyl)-ethyl)benzoyloxy)-2,3-difluorobenzene,
3% of trans-4-propylcyclohexyl trans-4-(trans-4-propylcyclohexyl)-cyclohexanecarboxylate,
3% of trans-4-pentylcyclohexyl trans-4-(trans-4-propylcyclohexyl)-cyclohexanecarboxylate,
3% of trans-4-pentylcyclohexyl trans-4-(trans-4-butylcyclohexyl)-cyclohexanecarboxylate,
3% of trans-4-propylcyclohexyl trans-4-(trans-4-butylcyclohexyl)-cyclohexanecarboxylate,
5% of 4,4'-(trans-4-propylcyclohexyl)-2-fluorobiphenyl,
4% of 4,4'-(trans-4-propylcyclohexyl)-biphenyl,
4% of 4,4'-(trans-4-pentylcyclohexyl)-2-fluorobiphenyl,
6% of 2,3-difluoro-4-[trans-4-(trans-4-pentylcyclohexyl)-cyclohexyl]-1-ethoxybenzene and
6% of 4-(trans-4-pentylcyclohexyl)-4'-(trans-4-propyl cyclohexyl)-biphenyl
is distinguished by a broad nematic phase range and a low bifringence.

EXAMPLE B

A nematic liquid-crystal medium consisting of
19.8% of 4-(trans-4-propylcyclohexyl)-ethylbenzene,
18.0% of 4-(trans-4-propylcyclohexyl)-methoxybenzene,
13.5% of 4-(trans-4-propylcyclohexyl)-ethoxybenzene,
17.1% of 4-(trans-4-propylcyclohexyl)-4'-ethylbiphenyl,
12.6% of 4-(trans-4-pentylcyclohexyl)4-ethylbiphenyl
4.5% of 4,4'-bis-(trans-4-propylcyclohexyl)-biphenyl,
4.5% of 4–4'-bis-(trans-4-pentylcyclohexyl)biphenyl and
10.0% of 5-(2,3-difluoro-4-octyloxybenzoyloxy)-2-(2-(trans-4-heptylcyclohexyl)-ethyl)-pyridine
has a clear point of 78.4°, Δn 0.1143 and a viscosity of 14.4 mm²/sec.

We claim:

1. A compound having a 2,3-difluorophenylene group of the formula

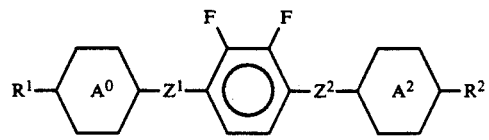

wherein
R$^1$ and R$^2$ independently of one another are each alkyl having 1-15 C atoms or alkenyl having 3-15 C atoms, wherein a CH$_2$group can be replaced by —O—, —CO—, —O—CO—, —CO—O— or —O—CO—O—;

is 1,4-phenylene or trans-1,4-cyclohexylene;

is 1,4-cyclohexylene wherein one or two non-adjacent CH$_2$ groups can be replaced by —O— or 1,4-phenylene which is unsubstituted or monosubstituted or disubstituted by fluorine and in which one or two CH groups can be replaced by N;

Z$^1$ is —CO—O—, —O—CO—, —CH$_2$O—, or —OCH$_2$—; and

Z$^2$ is —CO—O—, —O—CO—, —CH$_2$O—, —OCH$_1$—, or —CH$_2$CH$_2$—.

2. A compound according to claim 1, wherein Z$^1$ is —CH$_2$—O—, —O—CH$_2$—, or —O—CO— and Z$^2$ is —CH$_2$CH$_2$—, —CH$_2$O—, —OCH$_2$—, or —CO—O—.

3. A compound according to claim 1, wherein Z$^2$ is —CO—O— or —O—CO—.

4. A compound according to claim 1, wherein R$^1$ and R$^2$, independently of one another, are each linear alkyl or alkoxy, in each case having 1 to 15 C atoms.

5. In a liquid-crystal medium containing at least two liquid-crystal compounds, the improvement wherein at least one of said components is a compound according to claim 1.

6. In a liquid-crystal display element containing a liquid-crystal medium, the improvement where said medium is a medium according to claim 5.

7. In an electrooptical display element containing a dielectric, the improvement wherein said dielectric is a liquid-crystal medium according to claim 5.

8. A display according to claim 7, wherein said display is an ECB-type and R$^1$ and R$^2$, each independently, have 1-7 C atoms.

9. A display according to claim 7, wherein said display is a display based on SSFLC technology and R$^1$ and R$^2$, each independently, have 7-15 C atoms.

10. A medium according to claim 5, wherein said medium exhibits a chirally tilted smectic phase.

11. A compound according to claim 1, wherein said compounds are of formulae I6-I12

R$^1$—Cyc—Z$^1$—PheF$_2$—Z$^2$—Phe—R$^2$   I6,

R$^1$—Cyc—Z$^1$—PheF$_2$—Z$^2$—Cyc—R$^2$   I7,

R$^1$—Phe—Z$^1$—PheF$_2$—Z$^2$—Pry—R$^2$   I8,

R$^1$—Phe—Z$^1$—PheF$_2$—Z$^2$—Phe—R$^2$   I9,

R$^1$—Phe—Z$^1$—PheF$_2$—Z$^2$—Pyd—R$^2$   I10,

R$^1$—Cyc—Z$^1$—PheF$_2$—Z$^2$—Pyd—R$^2$   I11,

R$^1$—Cyc—Z$^1$—PheF$_2$—Z$^2$—Pyr—R$^2$   I12, wherein:

Cyc is a 1,4-cyclohexylene group,
PheF$_2$ is a group of the formula

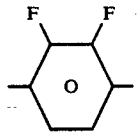

Phe is a 1,4-phenylene group,
Pyd is a pyridine-2,5-diyl group, and
Pyr is a pyrimidin-2,5-diyl group.

12. A compound according to claim 1, wherein said compound is of formula I7

R$^1$—Cyc—Z$^1$—PheF$_2$—Z$^2$—Cyc—R$^2$   I7, wherein:
Cyc is a 1,4-cyclohexylene group, and
PheF$_2$ is a group of the formula

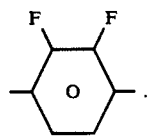

13. A compound according to claim 1, wherein said compound is of formulae alkyl—Cyc—CH$_2$O—PheF$_2$—CH$_2$CH$_2$—Cyc—alkyl, alkyl—Cyc—CO—O—PheF$_2$—CH$_2$CH$_2$—Cyc—alkyl, alkyl—Phe—CO—O—PheF$_2$—CH$_2$CH$_2$—Cyc—alkyl, alkoxy—Phe—CO—O—PheF$_2$—CH$_2$CH$_2$—Cyc—alkyl, alkoxy—Phe—CO—O—PheF$_2$—O—CO—Cyc—alkyl, alkoxy—Phe—CO—O—PheF$_2$—O—CO—Phe—alkyl, alkoxy—Phe—CO—O—PheF$_2$—O—CO—Phe—alkoxy, alkoxy—Phe—CO—O—PheF$_2$—CO—O—Phe—alkoxy, alkoxy—Phe—CO—O—PheF$_2$—CO—O—Phe—alkoxy, alkyl—Phe—CO—O—PheF$_2$—CO—O—Phe—alkoxy, alkyl—Phe—CO—O—PheF$_2$—CO—O—Phe—alkyl, alkyl—Phe—CO—O—PheF$_2$—CO—O—Pyd—alkyl, wherein
Cyc is a 1,4-cyclohexylene group,
PheF$_2$ is a group of the formula

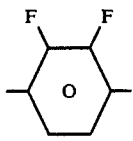

Phe is a 1,4-phenylene group, and
Pyd is a pyridine-2,5-diyl group.

14. A compound according to claim 1, wherein $Z^1$ is —CO—O— or —O—CO—, and $Z^2$ is —CO—O—, —O—CO—, or —CH$_2$CH$_2$—.

15. A compound according to claim 1, wherein $Z^2$ is CH$_2$CH$_2$.

16. A compound according to claim 1, wherein said compound is 4-(4-(2-(trans-4-propylcyclohexyl)-ethyl)-2,3-difluorobenzoyloxy)-pentylbenzene;

4-(4-(2-(trans-4-pentylcyclohexyl)-ethyl)-2,3-difluorobenzyoyloxy)-pentylbenzene;

trans-(4-(4-(trans-4-pentylcyclohexyl)-ethyl)-2,3-difluorobenzoyloxy)-hexylcyclohexane;

4-(2-(trans-4-pentylcyclohexyl)-ethyl)-1-(4-dodecyloxybenzoyloxy)-2,3-difluorobenzene;

1,4-di-(trans-4-heptylcyclohexylcarbonyloxy)-2,3-difluorobenzene;

1,4-di-(trans-4-pentylcyclohexylcarbonyloxy)-2,3-difluorobenzene;

1,4-di-(trans-4-octylcyclohexylcarbonyloxy)-2,3-difluorobenzene;

trans-4-pentylcyclohexylmethyl 4-(2-(trans-4-pentylcyclohexyl)-ethyl)-2,3-difluorophenyl ether;

4-(2-(trans-4-pentylcyclohexyl)-ethyl)-2,3-difluorophenyl 4-octyloxybenzoate; or 4-(2-(trans-4-pentylcyclohexyl)-ethyl)-2,3-difluorophenyl trans-4-pentylcyclohexanecarboxylate.

* * * * *